Feb. 1, 1955 L. J. GIACOLETTO 2,701,302
SEMICONDUCTOR FREQUENCY CONVERTER
Filed March 29, 1951
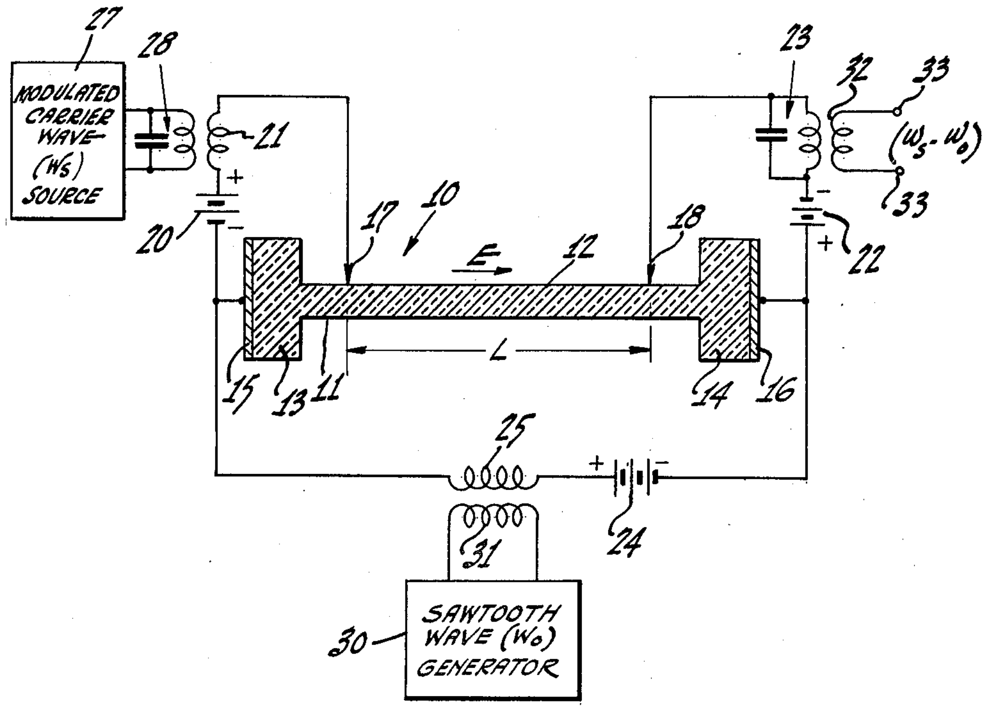
INVENTOR
LAWRENCE J. GIACOLETTO
BY H. L. Meister
ATTORNEY United States Patent Office 2,701,302

Patented Feb. 1, 1955

2,701,302

SEMICONDUCTOR FREQUENCY CONVERTER

Lawrence J. Giacoletto, Eatontown, N. J., assignor to Radio Corporation of America, a corporation of Delaware Application March 29, 1951, Serial No. 218,169

2 Claims. (Cl. 250—20)

This invention relates generally to frequency conversion systems, and particularly relates to a system including a semi-conductor device for converting the frequency of a modulated carrier wave to a lower frequency.

The theoretical conversion transconductance of a conventional superheterodyne frequency conversion system is given by $1/\pi$ or 32 per cent of the maximum amplifier transconductance. In practice the conversion transconductance will be even less. It has been pointed out by E. W. Herold (Proceedings IRE, April 1946, pages 184–198) that the theoretical conversion transconductance of converters may be doubled by suddenly reversing the phase of the output current. The reversal of output current phase can be accomplished either by phase modulation of the output current or by means of a circuit and/or a vacuum tube exhibiting both positive and negative transconductance. In that case, the actually obtained conversion transconductance may approach 64 per cent of the maximum amplifier transconductance.

In a subsequent paper G. Diener and K. S. Knol (Philips Research Report, vol. 4, June 1949, pages 161–167) have shown that a theoretical conversion transconductance of 100 per cent of the maximum amplifier transconductance may be obtained under certain conditions. In that case, the phase angle of the output current is a function of time and must be varied continuously in a certain manner. This phase variation is obtained by transit time variations in a special beam deflection tube.

In accordance with the present invention, a semi-conductor device is utilized for effecting a variation of the transit time of the charge carriers flowing between certain electrodes of the device thereby to obtain a high conversion transconductance which may approach the maximum amplifier transconductance for an impressed high-frequency signal. 100 per cent frequency conversion means that the entire output energy is at the desired intermediate frequency which results from the interaction of the carrier wave to be converted with a local oscillator voltage.

The semi-conductor device, which is used in accordance with the present invention preferably is a transistor of the filamentary type. Such a transistor has been disclosed in the Patent 2,502,479 to G. L. Pearson and W. Shockley. In this connection, reference is also made to a paper by J. A. Becker, which appears in the January 1950, issue of "Electrical Engineering" on pages 58–64 (see also W. Shockley, G. L. Pearson and J. R. Haynes, "Bell System Technical Journal," vol. 28, July 1949, pages 344–366).

It is accordingly an object of the present invention to provide an improved frequency conversion system which has a theoretical conversion of 100 per cent.

A further object of the invention is to provide a frequency conversion system including a filamentary transistor to which a local oscillator source and a carrier wave source may be connected to develop an output wave having substantially only energy at the resulting intermediate frequency.

Another object of the invention is to provide a transistor frequency conversion system wherein a carrier wave input circuit and a local oscillator circuit may be isolated electrically one from the other.

A still further object of the invention is to provide an improved frequency conversion system of the type referred to wherein cross modulation may considerably be reduced.

A frequency conversion system in accordance with the present invention preferably comprises a filamentary transistor, that is, a transistor having a semi-conducting body with an elongated attenuated portion, that is, having an elongated body portion of reduced and preferably uniform cross section between larger end portions. Two electrodes are in low-resistance contact with opposite ends or larger end portions of the transistor body, being, therefore, at opposite ends with respect to the attenuated portion, while at least one or preferably two further electrodes are in rectifying contact with the attenuated portion. One of the low-resistance electrodes may be the base electrode, while the two rectifying electrodes may be respectively the emitter and the collector electrodes. The carrier wave source is coupled between emitter and base and the amplified output signal is obtained between the collector and the other low-resistance electrode. An electric field is applied across the ends of the attenuated portion and this electric field is modulated in accordance with the present invention by a local oscillator voltage. As will be more fully described hereinafter, a proper choice of the phase, wave shape and amplitude of the local oscillator voltage will result in a theoretical frequency conversion of 100 per cent.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the single figure is a circuit diagram of a frequency conversion system embodying the present invention.

Referring now to the drawing, there is shown a frequency conversion system including a semi-conductor device 10 which may be a filamentary transistor of the type disclosed in the Pearson patent or in the paper by Becker referred to. The filamentary transistor 10 includes a semi-conducting body 11 having an elongated attenuated portion 12. The attenuated portion 12 may consist of a fine filament of silicon or preferably of germanium or it may consist of a flat, thin sheet of the same material. The attenuated intermediate portion 12 may be provided with enlarged end portions 13, 14; it is, however, to be understood that the entire semi-conducting body 11 may have the same cross section throughout its length.

A pair of electrodes 15, 16 is provided in low-resistance contact to the enlarged end portions 13 and 14 respectively. In other words, electrodes 15 and 16 form ohmic connections with opposite ends of the attenuated portion 12. Another pair of electrodes 17 and 18 is provided in rectifying contact with the attenuated portion 12. The electrodes 17 and 18 may be point electrodes or they may consist of knife edges extending across an edge of attenuated portion 12, which may, in that case, consist of a flat sheet. The electrodes 17 and 18 preferably are spaced apart an appreciable distance L as indicated in the drawing.

Operating potentials are applied to the electrodes 15 to 18 in such a manner that electrode 15 forms a base electrode, electrode 17 the emitter and 18 the collector. It is, however, to be understood that rectifying electrode 18 may be omitted, in which case the electrode 16 forms the collector as disclosed in the Pearson patent referred to. For the following discussion, it will be assumed that semi-conducting body 11 is of the N type. A voltage in the forward direction is applied between electrodes 15 and 17, that is, between the base 15 and the emitter 17. To this end there may be provided a suitable source of voltage such as battery 20 having its negative terminal connected to base 15 and its positive terminal connected through inductor 21 to emitter 17.

A voltage in the reverse direction is applied between the low-resistance electrode 16 and collector 18. To this end, there may be provided a battery 22 having its positive terminal connected to low-resistance electrode 16 and its negative terminal connected through parallel resonant circuit 23 to collector 18. Finally an electric field is applied between electrodes 15 and 16. This field is applied in such a manner as to cause the charge carriers which are injected by emitter 17 to travel toward the collector 18. If we assume again that body 11 consists of an N type crystal, the emitter 17 will inject holes, that is, electrical particles which behave as if they had a positive charge. Accordingly, electrode 16 should be negative with respect to electrode 15 and for this purpose there may be provided a battery 24 having its positive terminal connected to base 15 through inductor 25 and having its negative terminal connected to electrode 16.

It will be understood that if semi-conducting body 11 is of the P type, the applied potentials must be reversed. In that case, the emitter 17 will inject electrons into the semi-conducting body 11. Consequently, in order to cause the electrons to travel toward collector 18, the electrode 16 should be positive with respect to the base 15.

A modulated carrier wave is developed by source 27 indicated schematically. The modulated carrier wave developed by source 27 has an angular velocity of $\omega_s$, wherein $\omega_s = 2\pi f_s$ and where $f_s$ is the frequency of the carrier wave developed by the source 27. A parallel resonant circuit 28 tuned to the frequency of the carrier wave forms the output of source 27 and is inductively coupled to inductor 21. Accordingly, the modulated carrier wave is impressed on emitter 17.

In accordance with the present invention there is further provided a local oscillator voltage source indicated schematically at 30. The oscillator voltage generator 30 has an output inductor 31, which is coupled to inductor 25. Accordingly, the local oscillator voltage modulates the electric field E which is applied by battery 24 between the electrodes 15 and 16. The local oscillator voltage developed by generator 30 has an angular velocity of $\omega_0 = 2\pi f_0$, where $f_0$ is the frequency of the local oscillator voltage.

Parallel resonant circuit 23 connected between electrodes 16 and 18 forms the output circuit of the frequency conversion system. The parallel resonant circuit 23 is tuned to an intermediate frequency resulting from the interaction between the modulated carrier wave and the local oscillator voltage. The angular velocity of the intermediate frequency wave may be given by $\omega_s - \omega_0$. The intermediate frequency wave may be obtained from inductor 32 inductively coupled to parallel resonant circuit 23 and having a pair of output terminals 33.

If the wave developed by generator 30 is a sinusoidal wave with constant phase and amplitude, the frequency conversion cannot exceed 32 per cent. Such a frequency conversion system would be equivalent to a conventional frequency conversion system including, for example, a multigrid mixer tube of the vacuum type. By periodically and suddenly reversing the phase of the output voltage, it is possible to increase the maximum frequency conversion to 64 per cent as has been demonstrated in the paper by Herold above referred to.

In accordance with the present invention, it is, however, possible to approach 100 per cent frequency conversion. In order to obtain this result the amplitude, phase and the wave shape of the local oscillator voltage must be chosen in the correct manner. To obtain a better understanding of the necessary conditions, the following explanations will be helpful. It is well known that the transit time $t_L$ of charge carriers traveling a distance L through a semi-conducting material L is given by the following formula:

$$t_L = L/\mu E \tag{1}$$

wherein $\mu$ is the mobility of the charge carriers. Thus, if the charge carriers are holes, $\mu$ is the mobility of the holes and amounts to approximately 1700 cm./sec. per volt/cm. for germanium.

The modulated carrier wave impressed on emitter 17 causes a sinusoidal current $i_e$ to flow, which is given as follows:

$$i_e = I_e \sin(\omega_s t + \alpha_s) \tag{2}$$

wherein $I_e$ is a constant, $t$ is the time and $\alpha_s$ is the phase angle. In the same manner the sinusoidal current $i_c$ of the amplified output signal developed in output circuit 23 and caused by the input current $i_e$ is given as follows:

$$i_c = I_c \sin(\omega_s t + \alpha) \tag{3}$$

wherein $I_c$ is a constant and $\alpha$ is the phase angle of the output signal. If we assume $\alpha_s = 0$ we obtain the following relationship from Equation 1:

$$\alpha = \omega_s t_L = \omega_s L/\mu E \tag{4}$$

By substituting Equation 4 into 3, we obtain:

$$i_c = i_{if} = I_c \sin(\omega_s t + \omega_s L/\mu E) \tag{5}$$

wherein $i_{if}$ indicates the intermediate frequency output current.

An inspection of Formula 5 will indicate that by varying E at a predetermined frequency, different output currents may be obtained. Thus, if E is varied in accordance with a square wave phase reversal conversion as described by Herold may be obtained. As previously indicated, if the phase reversal takes place suddenly and periodically, the frequency conversion may approach 64 per cent. However, 100 per cent frequency conversion may be obtained by varying E substantially linearly with time. Thus E may be varied as follows:

$$E = E_0/(1-kt) \tag{6}$$

wherein $E_0$ indicates a constant electric field and $k$ a constant. $k$ may be chosen arbitrarily as follows:

$$k = \omega_0 \mu E_0/\omega_s L \tag{7}$$

from which we obtain:

$$\omega_0 = k\omega_s L/\mu E_0 \tag{7a}$$

by substituting Equation 6 and 7*a* into 5 we obtain:

$$\begin{aligned} i_{if} &= I_c \sin \omega_s(t + L/\mu E_0 - Lkt/\mu E_0) \\ &= I_c \sin[(\omega_s - \omega_0)t + \omega_s L/\mu E_0] \end{aligned} \tag{8}$$

An inspection of Equation 8 shows that the term which is multiplied by $t$ is proportional to the intermediate frequency, while the term of the sine wave which is not a function of $t$ (the phase angle) depends on the signal frequency and is, therefore, constant. Accordingly, the output current is at the intermediate frequency.

Now, it is not practical to have the electric field charge continuously and linearly with time as would be required by Equation 6. In accordance with the present invention, the electric field is, therefore, varied in a sawtooth fashion. For a period of time T between the intervals $t_1 = 0$ and $t_2 = 1/f_0$ the phase angle $\alpha$ may be given as follows (the time interval T indicates, of course, a cycle of the oscillator voltage):

$$\alpha = \omega_s L(1-kt)/\mu E_0 \tag{9}$$

It will be seen that Equation 9 is obtained by combining Equations 4 and 6. In accordance with this invention the change in phase angle is to be made a whole multiple of $\pi$. Accordingly, from Equation 9 we can write:

$$\Delta\alpha = \omega_s Lk\Delta t/\mu E_0 = \pm n\pi \tag{10}$$

wherein $n$ is an integer which may, for example, be 2. If the variation of the phase angle is to occur during a cycle of the local oscillator voltage (that is, $\Delta t = t_2 - t_1 = T$) we obtain $$\Delta\alpha = -\omega_s LkT/\mu E_0 = -\omega_s Lk/\mu E_0 f_0 = \pm n\pi \tag{11}$$

from (11) we obtain:

$$\begin{aligned} k &= \pm n\mu E_0 f_0/2Lf_s \\ &= \pm n\mu E_0 \omega_0/2L\omega_s \end{aligned} \tag{12}$$

Equations 11 or 12 indicate the value that $k$ must have in order that operation in accordance with the invention is obtained. The electric field during a cycle of the local oscillator voltage varies between $E_1$ and $E_2$ which are given as follows:

$$E_1 = E_0 \tag{13a}$$

$$E_2 = E_0/(1-k/f_0) \tag{13b}$$

The above equations are obtained from Equation 6 by substituting for $t$ the values $t_1 = 0$ and $t_2 = 1/f_0$. The voltage V, which must be developed by the local oscillator, is given as follows:

$$V = E_0 L/(1-kt) \simeq E_0 L(1+kt) \quad \text{(during the interval T)} \tag{14}$$

For one cycle of the oscillator wave the voltages $V_1$ and $V_2$ are as follows:

$$V_1 = E_0 L \tag{14a}$$

$$V_2 = E_0 L/(1-k/f_0) \tag{14b}$$

It will accordingly be seen that at the time $t_1$ the electric field $E_1$ is developed entirely by battery 24 and the local oscillator voltage is 0. At the time $t_2$ the local oscillator voltage $V_2$ is a function of $k$ which, in turn, is a function of $\omega_s$ (see Equation 12). Accordingly, the peak amplitude of the sawtooth local oscillator voltage must be adjusted in accordance with the frequency of the carrier wave to be converted. From Equation 14 the change in voltage, ΔV, is approximately given as follows:

$$\Delta V \simeq E_0 L k \Delta t \qquad (15)$$

It will be understood that the sawtooth wave shape of the oscillator voltage may have a slowly rising and a rapidly falling amplitude or a rapidly rising and a slowly falling amplitude or the amplitude may rise and fall symmetrically. Voltage generators which will develop such a sawtooth voltage wave are, of course, well known in the art.

By way of example, we may assume the following values of the constants entering the above equations. Assume $L=1.7$ cm., $\mu$ has the value indicated above, $n=2$, $E_0=100$ volts/cm. and $f_0=10^6$ cycles/sec. If we further assume that $f_0$ is approximately equal to $f_s$ (as is usually the case), then we obtain from Equation 12 $k=10^5$ sec.$^{-1}$. If $\Delta t$ is again the time interval corresponding to a cycle of the oscillatory wave, we obtain from Equation 15 $\Delta V=1.7\times10^7/f_0$ volts$=17$ volts. Thus, it will be seen that the peak amplitude of the sawtooth local oscillator voltage must be 17 volts.

It will, of course, be understood that 100 per cent frequency conversion cannot be obtained in practice. A reduction of the frequency conversion may, for example, be caused by stray coupling or direct coupling between the input and output circuits. Furthermore, a perfect sawtooth variation of the output signal phase angle is not possible because there must always be a finite return time for the phase angle. Finally the input signal will be distorted to a certain extent due to the peculiarities of the conduction through a semi-conducting body by means of holes.

The frequency conversion system of the present invention has the advantage that the conversion power gain may approach the power gain to be expected from a transistor when used as an amplifier. The signal input circuit is well isolated from the local oscillator circuit and, in view of the isolation of the signal input, local oscillator and signal output circuits, better circuit design is made possible. Finally a considerable reduction of cross modulation may be expected over that present in conventional vacuum tube frequency conversion systems. This is due to the greater linearity of the input signal circuit, that is, linear conversion over large signal amplitude ranges is made possible. The large conversion gain is made possible because the transit time of the charge carriers is effectively modulated, the number of charge carriers, in turn, being determined by the amplitude of the carrier wave to be converted.

What is claimed is:

1. A frequency conversion system comprising a semiconductor device including a semi-conducting body having an elongated attenuated portion, a first and a second electrode, each being in low-resistance contact respectively with one end of said attenuated portion, a third and a fourth electrode, each being in rectifying contact with said attenuated portion and having a predetermined substantial spacing from each other; means for applying a voltage in the forward direction between said first and third electrodes and for applying a voltage in the reverse direction between said fourth and second electrodes, means for applying an electric field between said first and second electrodes to cause charge carriers injected by said third electrode to travel toward said fourth electrode, a modulated carrier wave source, means coupling said source between said first and third electrodes, means including a local oscillator voltage source coupled between said first and second electrodes for modulating said electric field, said local oscillator voltage having a substantially sawtooth wave shape wherein the voltage V of said sawtooth voltage wave during each cycle is given by $V=E_0L/(1-Kt)$, where $E_0$ is said electric field, L is the distance between said third and fourth electrodes, $t$ is the time interval between two successive cycles, and where $k=\pm n\omega_0\mu E_0/2\omega_s L$, $\mu$ being the mobility of said charge carriers, $\omega_0$ and $\omega_s$ being respectively the angular velocity of said oscillator voltage and of said carrier wave, and $n$ being an integer, and an output circuit coupled between said fourth and second electrodes, said output circuit being tuned to an intermediate frequency resulting from the interaction between said modulated carrier wave and said local oscillator voltage.

2. A frequency conversion system comprising a semiconductor device including a semi-conducting body having an elongated attenuated portion, a first and a second electrode, each being in low-resistance contact respectively with one end of said attenuated portion, and at least one further electrode in rectifying contact with said attenuated portion; means for applying a voltage in the forward direction between said first and further electrodes and for applying a voltage in the reverse direction between said first and second electrodes, thereby to provide an electric field between said first and second electrodes causing charge carriers injected by said further electrode to travel toward said second electrode, a modulated carrier wave source, means coupling said source between said first and further electrodes, means including a local oscillator voltage source coupled between said first and second electrodes for modulating said electric field, said local oscillator voltage having a substantially sawtooth wave shape wherein the voltage V of said sawtooth voltage wave during each cycle is given by $V=E_0L/(1-Kt)$, where $E_0$ is said electric field, L is the distance between said third and fourth electrodes, $t$ is the time interval between two successive cycles, and where $k=\pm n\omega_0\mu E_0/2\omega_s L$, $\mu$ being the mobility of said charge carriers, $\omega_0$ and $\omega_s$ being respectively the angular velocity of said oscillator voltage and of said carrier wave, and $n$ being an integer, and an output circuit coupled between said further electrode and said second electrode, said output circuit being tuned to an intermediate frequency resulting from the interaction between said modulated carrier wave and said local oscillator voltage.

References Cited in the file of this patent

UNITED STATES PATENTS

| | | |
|---|---|---|
| 2,476,323 | Rack | July 19, 1949 |
| 2,502,479 | Pearson et al. | Apr. 4, 1950 |
| 2,553,490 | Wallace, Jr. | May 15, 1951 |
| 2,553,491 | Shockley | May 15, 1951 |
| 2,569,347 | Shockley | Sept. 25, 1951 |
| 2,600,500 | Haynes et al. | June 17, 1952 |

OTHER REFERENCES

Crystal-Tetrode Mixer: Rowland W. Haegele, Electronics, for October 1949; pages 80 and 81.